United States Patent [19]

Borzym et al.

[11] Patent Number: 4,932,297
[45] Date of Patent: * Jun. 12, 1990

[54] CUT-OFF DIE SET

[75] Inventors: John J. Borzym, Birmingham; Alexander Borzym, West Bloomfield, both of Mich.

[73] Assignee: Alpha Industries, Inc., Noi, Mich.

[*] Notice: The portion of the term of this patent subsequent to Aug. 30, 2005 has been disclaimed.

[21] Appl. No.: 237,527

[22] Filed: Aug. 26, 1988

Related U.S. Application Data

[62] Division of Ser. No. 129,429, Nov. 25, 1987, Pat. No. 4,766,792.

[51] Int. Cl.⁵ ............................................. B26D 1/60
[52] U.S. Cl. ..................................... 83/319; 83/54; 83/310; 83/320
[58] Field of Search ............... 83/300, 319, 320, 310, 83/519, 54, 875, 877, 916, 917, 862, 700

[56] References Cited

U.S. PATENT DOCUMENTS

| | | | |
|---|---|---|---|
| 3,273,433 | 9/1966 | Borzym | 83/54 |
| 4,055,100 | 10/1977 | Borzym | 83/54 |
| 4,108,029 | 8/1978 | Borzym | 83/300 |
| 4,513,492 | 4/1985 | Gallas | 83/54 |
| 4,563,927 | 1/1986 | Kinsley | 83/319 |

Primary Examiner—Douglas D. Watts
Assistant Examiner—Scott A. Smith
Attorney, Agent, or Firm—Krass & Young

[57] ABSTRACT

A ram-driven cut-off die set of the double-cut type in which sections of tubing are successively severed from a continous length of tubing by a notching cut followed by a severing cut wherein improved means are provided for mounting and guiding the notching blade in its notching movement. The improved mounting means comprises an upper shaft positioned over the tube path and extending from one side to the other side of the path, a lower guide shaft positioned totally on the one side of the tube path, and a cross slide having a relatively long upper portion slidably journalled on the upper shaft and a relatively short lower portion journalled on the lower guide shaft to maximize the magnitude of the journalling support provided to the notching blade as it makes its reciprocal movement across the tube path to accomplish the notching cut.

4 Claims, 3 Drawing Sheets

CUT-OFF DIE SET

This application is a division, of application Ser. No. 129,429, filed 11/25/87, now U.S. Pat. No. 4,766,792.

FIELD OF THE INVENTION

This invention relates to tube cutting apparatus of the type used to continuously lengths of tubing from tubing or other elongated stock continuously emanating from a mill in the which the apparatus includes a cut-off die set operated by a ram and wherein the die set is caused to be clamped to the tubing during the severing operation and wherein the severing operation is carried out by a vertically reciprocating cut-off blade. More particularly, the present invention is drawn to an improvement in the notching mechanism which is used in conjunction with the cut-off die set to notch the upper periphery of the tubing just prior to severing by the main cut-off blade.

BACKGROUND OF THE INVENTION

In cut-off die sets of the double cut or pre-notching type, a notching blade is reciprocated across the upper periphery of the tubing after the tubing is clamped within the die set clamping jaws and just prior to descent of the main cut-off blade or guillotine. The pre-notching eliminates the cusping or dimpling of the tubing to a large extent to the point that subsequent reshaping of the ends of the severed length of tubing is not normally required. Whereas this general arrangement of a pre-notching cut followed by a final severing operation is generally satisfactory in producing tubing which does not require any subsequent reshaping, it is imperative that the notching blade be mounted in such a way that its reciprocating notching movement is precise and firmly supported throughout the movement of the blade.

SUMMARY OF THE INVENTION

Briefly summarized, the invention is an adjustable notching blade holder mounted to a horizontally reciprocating cross-slide assembly four use in a tube cutting apparatus of the double cut type, wherein the notching blade is positioned perpendicular to the tube path and adjacent to the outer surface of the tubing to perform either a "pull-across" or "forward thrust" notching motion.

In general, the adjustability is accomplished by a vertical guideway established on the cross-slide assembly combined with a means of adjusting the vertical position of the notching blade holder on said guideway, further including a means for retaining the notching blade holder in any position of vertical adjustment.

In the preferred form a set of L-shaped brackets are mounted to the cross slide forming a vertical guideway, each bracket having a lug portion at the lower end extending outward from the cross slide at right angles. The notching blade holder is retained in the vertical guideway by means of a slide member contained between the projections of the L-shaped brackets. A pair of first and second vertically extending parallel screws are the means for allowing vertical adjustment of the notching blade holder. The adjustment screws threadaby engage the notching blade holder at their upper ends, the head portions of the first and second screws engage the lug portions of the brackets extending outward from the cross-slide assembly.

The adjustment screws and lug portions of the brackets also perform the means for locking the notching blade assembly in position. The locking means is accomplished by said first screw bearing downwardly against the upper surface of the first bracket lug, and said second screw passing through a bore located in the second bracket lug and bearing upward upon the lug undersurface. The combination of parallel screws acting upon opposite bearing surfaces causes the notching blade holder to be firmly retained in the set position.

DETAILED DESCRIPTION OF THE PREFERRED EMBODIMENT

Figure 1:
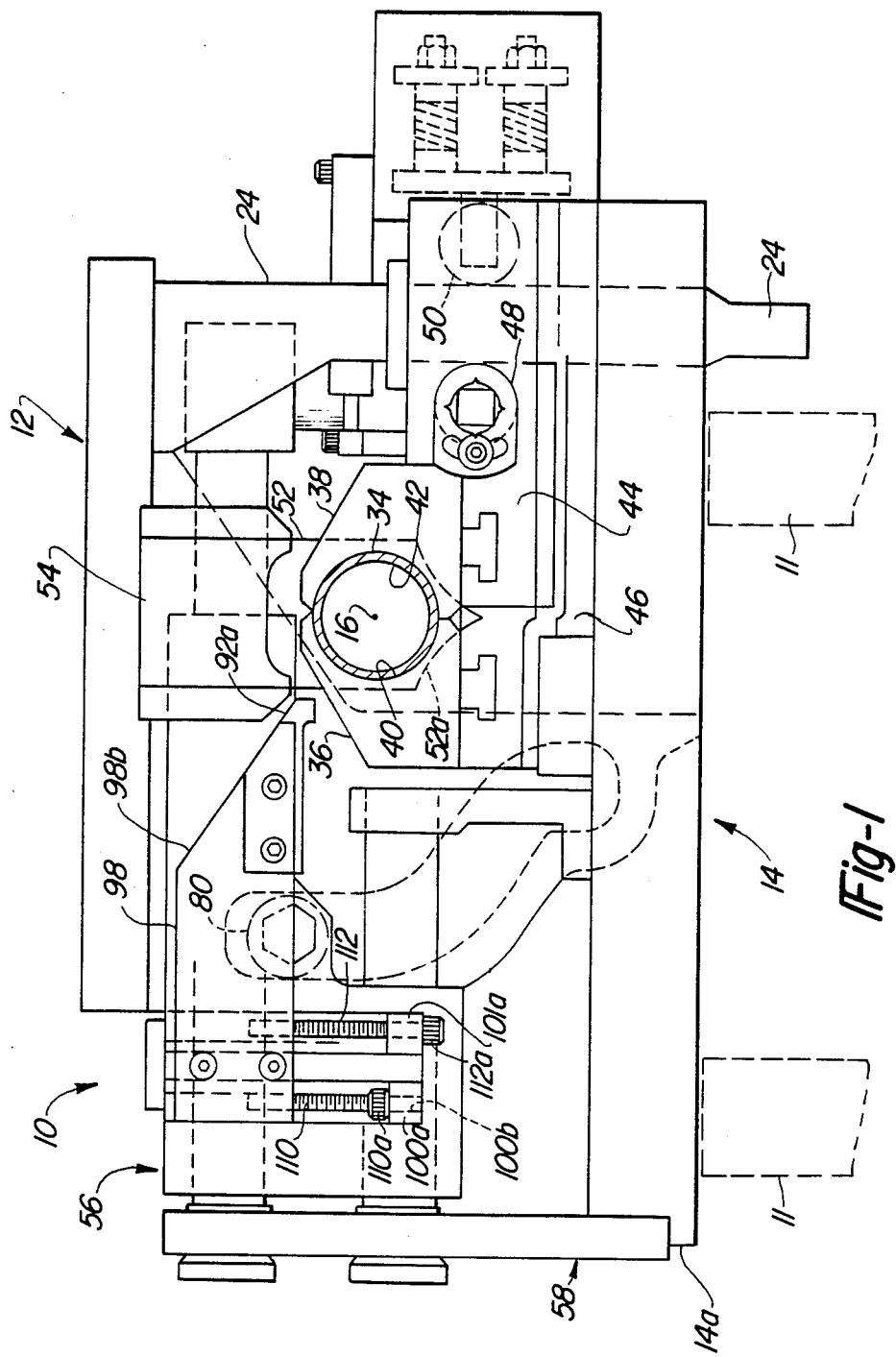
FIG. 1 is an end elevational view of a cut-off die set according to the invention.
Figure 2:
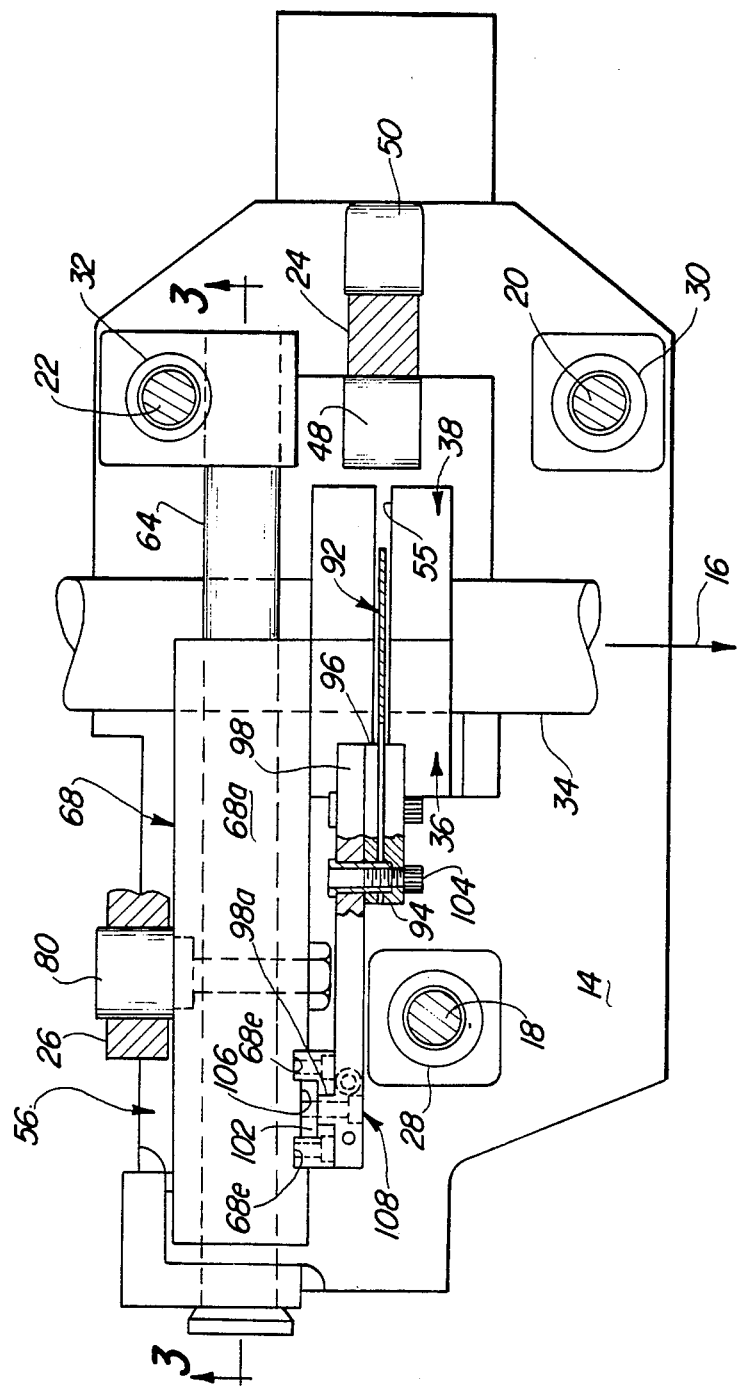
FIG. 2 is a top view of the invention cut-off die set with portions removed for clarity of illustration.
Figure 3:
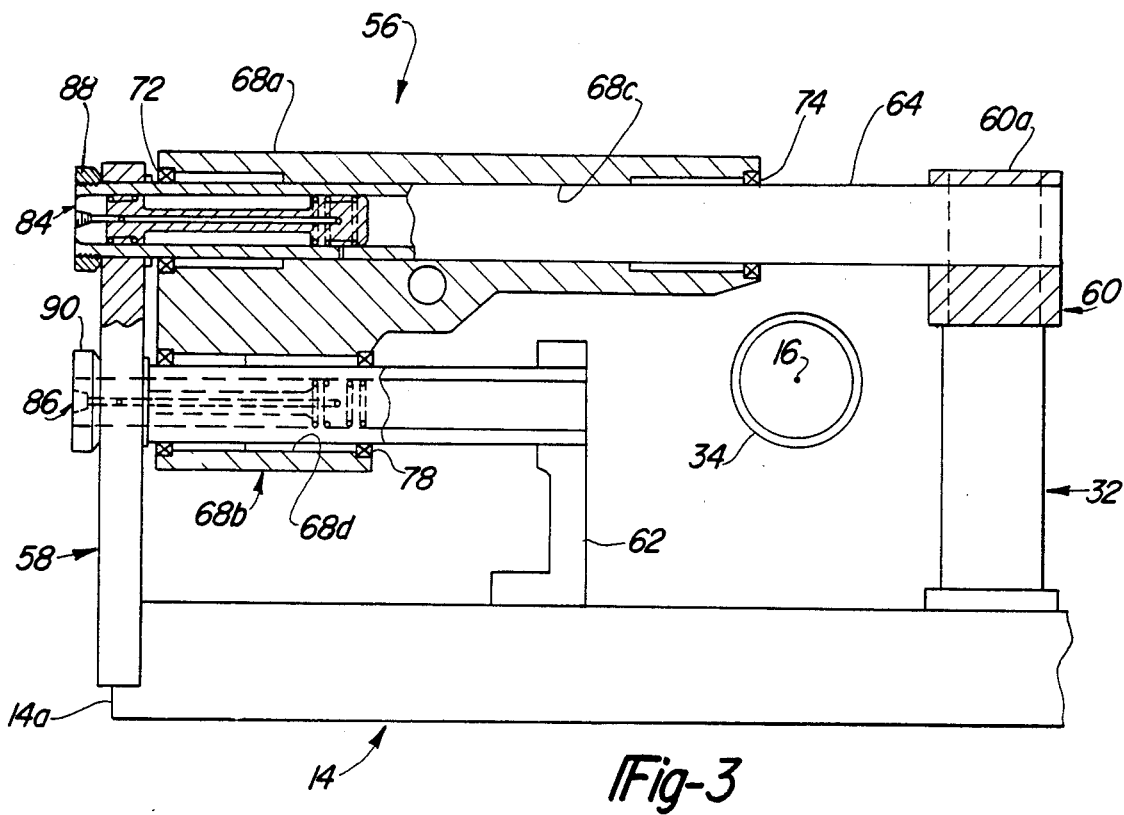
FIG. 3 is a cross-sectional view taken on line 3—3 of FIG. 2.
Figure 4:
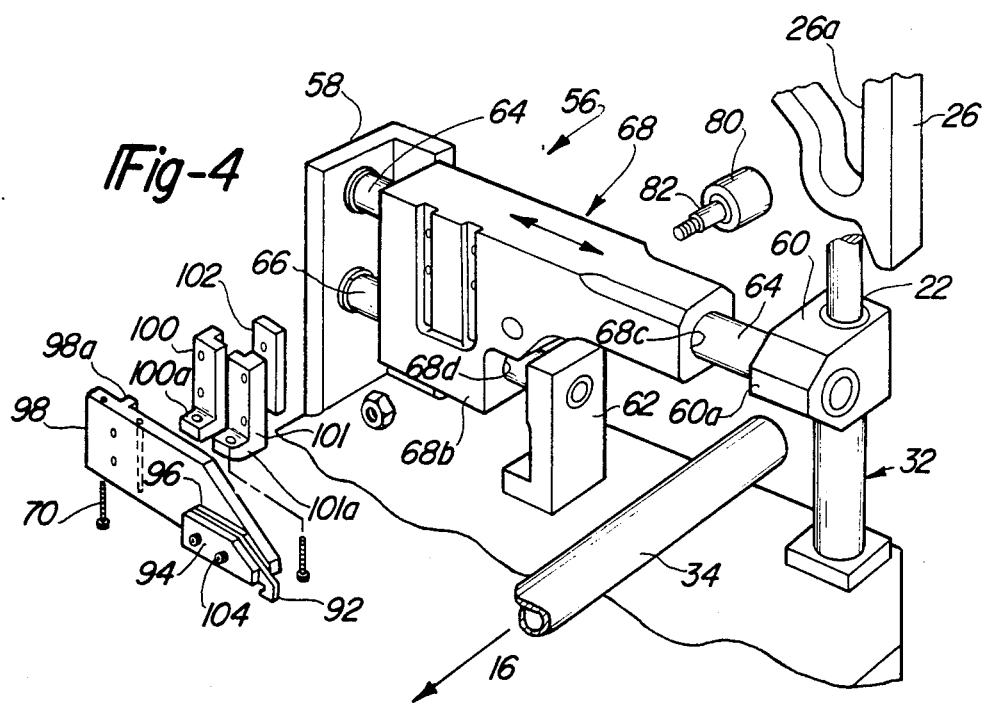
FIG. 4 is an exploded fragmentary view of the mounting means for the notching blade of the invention cut-off die set.

The invention cut-off die set 10 is adapted to be employed in a tube cutting apparatus and is slidably movable along a set of rails 11 extending from the tube-forming mill. The tube cutting apparatus normally includes a swinging or reciprocating ram mechanism which serves to operate the cut-off die set 10. In die sets of the general type with which the present invention is concerned, the cut-off die set is positioned to receive the tubing as it emanates from the processing fabrication mill and the ram mechanism operates to cause the clamping jaws within the die set to be operated to clamp the die set to the rapidly moving tubing. The die set, clamped to the moving tube, moves together with the tube along the rail set extending from the mill. The ram mechanism then causes the notching blade to make a notching cut in the upper periphery of the tubing whereafter the main cut-off blade is lowered to sever a length from the moving tube. Following the final severing cut, the ram mechanism, then operating in a reverse manner, first causes retraction of the main cut-off blade and the notching blade and then unclamping of the die set from the tube section as the cut-off die set approaches the end of its travel on the rail set. The cut-off die set is then returned to its initial position on the rail set preparatory to initiation of a new cut-off cycle.

Cut-off die set 10 includes an upper platen or shoe 12 and a lower platen or shoe 14.

Upper platen 12 overlies the tube path 16 and includes three guide rods 18, 20 and 22 extending downwardly from spaced locations on the underside of platen 12. Guide rod 18 is positioned on the lefthand or near side of tube path 16 and guide rods 20 and 22 are positioned at the front and rear of the cut-off die set respectively on the righthand or remote side of tube path 16. A die jaw cam 24 extends downwardly from upper platen 12 generally between guide rods 20 and 22 and a cam guide 26 extends downwardly from upper platen 12 adjacent the rear edge thereof and on the near or lefthand side of tube path 16.

A plurality of guide sleeves or bushings 28, 30 and 32 upstand from lower platen 14 and respectively telescopically receive the lower ends of guide rods 18, 20 and 22 so as to guide upper platen 12 in its reciprocal vertical movement relative to lower platen 14 during the tube severing operation.

The tubing 34 emanating from the tube forming mill is caused to be clamped to the die set 10 by means of a pair of die jaws 36 and 38 each having a complimentary inner radius contour 40 and 42, respectively, complimentary to the tube contour when the clamping jaws 20 and 22 are caused to advance toward each other so as to engage tube 34. The reciprocal clamping and disengaging movement of die jaws 36 and 38 is produced by sliding movement of an upper die jaw holder 44 and a lower die jaw holder 46 slidable on each other. The die clamping jaws 36 and 38 are adapted to be reciprocated towards and away from each other in synchronism with the vertical movement of the upper platen relative to the lower platen by coaction of die jaw cam 24 passing between a pair of clamping rollers 48 and 50 carried respectively by the upper die jaw holder 44 and lower die jaw holder 46. The manner in which the cam 24 coacts with the rollers 48 and 50 to move the die jaws 36 and 38 into and out of clamping engagement with tube 34 will not be further described since this mechanism is known and is not part of the present invention. Further details of a mechanism of this type may be found in U.S. Pat. Nos. 4,108,029 and 4,294,147, both assigned to the assignee of the subject application.

A main cut-off blade or guillotine 52 is mounted in a blade holder assembly 54 which in turn is secured to the underside and extends downwardly from upper platen 12. Die jaws 36 and 38 are slotted transversely at 55 relative to the tube axis to provide a clearance space through which the blade 52 will pass upon the ram operating mechanism reciprocating the upper platen 12 downwardly sufficiently to pass through the plane of the tube.

A notching mechanism seem generally at 56 operates to provide a notching cut in the upper periphery of the tube prior to the downward severing movement of the guillotine 52 so as to preclude the necessity of further working of the severed tube section following the severing operation. The present invention relates primarily to the improved notching mechanism 56. Notching mechanism 56 includes a support bracket 58, a support bracket 60, a support bracket 62, an upper guide shaft 64, a lower guide shaft 66, a cross slide 68, and a notching or scarfing blade assembly 70.

Support bracket 58 is L-shaped in cross section and upstands rigidly from lower platen 14 at the nearside of tube path 16 adjacent the lefthand edge 14a of the lower platen 14.

Support bracket 60 is positioned on the upper end of bushing 32 and includes a forwardly extending journal portion 60a.

Bracket 62 upstands rigidly from lower platen 14 at a location between bracket 58 and tube path 16.

Upper guide shaft 64 is secured at its near or lefthand end in support bracket 58 and at its remote or righthand end in journal portion 60a of support bracket 60. Upper guide shaft 64 thus extends across the tube path 16 from a location on the nearside of the tube path to a location on the other or remote side of the tube path.

Lower guide shaft 66 is positioned parallel to, below, and in the same vertical plane as upper guide shaft 64 with its lefthand or near end 66 mounted in support bracket 58 and its righthand or other end secured in support bracket 62. Lower guide shaft 66 is thus positioned totally on the near or lefthand side of tube path 16.

Cross slide 68 includes a relatively long upper portion 68a and a relatively short lower portion 68b. Upper guide shaft 64 passes through a through-bore 68c in upper cross slide portion 68a and lower guide shaft 66 passes through a through-bore 68d in lower cross slide portion 68b. A pair of bearings 72 and 74 at the opposite ends of through-bore 68c facilitate the journalling of upper guide shaft 64 in through-bore 68c and a pair of bearings 76 and 78 facilitate the journalling of lower guide shaft 66 in through-bore 68d.

A roller cam follower 80 secured by a screw 82 to cross slide 68 guides in the curvilinear cam track 26a of cam 26 to reciprocate cross slide 68 back and forth on guide shafts 64 and 66 in response to relative vertical movement between upper platen 12 and lower platen 14. Upper guide shaft 64 is hollow and receives a lubricating fitting 84 to facilitate the introduction of lubricant into the sliding interface between through-bore 68c and upper cross slide portion 68a. Similarly, lower guide shaft 66 is hollow and receives a lubricating fitting 86. Nuts 88 and 90 on the respective left or near ends of shafts 64 and 66 facilitate the mounting of the shafts in their respective brackets.

Notching blade assembly 70 includes a notching or scarfing blade 92, blade clamps 94 and 96, a blade holder 98, guide brackets 100 and 101, and a slide 102.

Blade 92 is clamped to the righthand or free end of blade holder 98 by screws 104 which secure the blade to the free end of the blade holder in sandwich fashion between clamps 94 and 96. Thus secured, notching blade 92 lies in the plane of cut-off blade 52 and in alignment with slot 55 in die jaws 36 and 38

Brackets 100 and 101 are secured by screws respectively in a pair of parallel vertical grooves 68e formed in the forward face of cross slide 68. Brackets 100 and 101 are L-shaped in cross section and are mounted to the forward face of cross slide 68 in confronting relation to each other so as to define a guide channel 106 for vertical sliding receipt of slide member 102. A vertical rib 98a on the rear face of blade holder 98 passes through the confronting inturned edges of brackets 100 and 101 for engagement with the front face of slide 102. Blade holder 98 is secured to slide 102 by suitable screws 108.

A first adjustment screw 110 is threadably engaged at its upper end in a threaded bore in blade holder 98 with its head 110a positioned on top of and pressing against a foot portion 100a of bracket 100, and a second adjusting screw 112 is positioned with its upper end threadably engaging a threaded bore in blade holder 98 and with its lower end passing freely through a foot portion 101a of bracket 101 to position its head portion 112a on the underside of foot portion 101a. Screw 110 is adjusted by an Allen head wrench passed upwardly through a bore 100b in foot portion 100a of bracket 100 and screw 112 is adjusted by an Allen head wrench received directly in a suitable socket in head 112a. It will be seen that selective adjustment of screws 110 and 112 selectively varies the vertical position of blade holder 98, and thereby blade 92, with respect to cross slide 68 and provides a firm, non-cocking mounting of the blade on cross slide 68 irrespective of the position of vertical adjustment of the blade on the cross slide.

The described mounting arrangement for the notching or scarfing blade will be seen to provide a firm positive support for the blade throughout its reciprocal motion to accomplish the notching stroke. Specifically, the described arrangement with the upper guide shaft extending completely across the path of the tubing in cooperation with the lower guide shaft positioned to one side of the tube path maximizes the journalling support of the cross slide and thereby maximizes the stability of the notching blade during its reciprocal movement. The provision of a positive and precise movement of the notching blade is important to the successful operation of a double-cut apparatus of the type disclosed since the synchronization between the notching blade and the guillotine or severing blade is critical. Specifically, since the notching blade and cut-off blade are moving in a common plane, and since time is of the essence in making a flying cut of the type involved in the double-cut apparatus, as the notching blade is moving from right to left across the upper periphery of the tube to make the notching cut the guillotine has already begun its downward movement to accomplish the severing cut. In actuality, the lefthand lower bevelled edge 52a of the guillotine passes precariously close to the righthand bevelled edges 98b and 92a of the blade holder and notching blade respectively so that any cocking or misalignment of the blade holder or notching blade could result in interference between the blade holder and notching blade and the descending cutting edge of the guillotine with disastrous results. The described support mechanism for the notching blade allows the various movements of the notching blade and guillotine to be precisely timed with the assurance that the exquisite clearances programmed between the guillotine and the notching blade will be maintained in actuality and over sustained periods of use of the apparatus.

Although a preferred embodiment of the invention has been illustrated and described in detail, it will be apparent that various changes may be made in the disclosed embodiment without departing from the scope or spirit of the invention.

We claim:

1. In a cut-off die apparatus for tubing of the double cut type including means for moving the tubing along a feed path, a platen positioned at one side of the feed path, a pair of die jaws movably mounted on the platen for selective movement into clamping relationship to the tubing as the tubing moves along the feed path, means for performing a notching cut by a notching blade mounted for reciprocal movement across the tube feed path, and means for performing a severing cut following the notching cut, the improvement wherein the mounting means for the notching blade comprises:
   (A) a first linear guide means extending effectively over said feed path and at essentially right angles thereto and immovably mounted on said platen in a position spaced from said die jaws on the side of said feed path opposite said one side thereof with said jaws positioned between said guide means and said platen;
   (B) a second linear guide means immovably mounted on sd aid platen below said first linear guide means and at essentially right angles to said feed path;
   (C) a cross slide mounted on said first and second linear guide means for reciprocal displacement thereover; and
   (D) means mounting said notching blade on said cross slide for reciprocal movement therewith across said path.

2. Apparatus as defined in claim 1 wherein said first and second linear guide means are substantially vertically spaced from one another.

3. A cut-off die apparatus for successively severing sections of tubing from a continuous length of tubing from a continuous length of tubing moving along a tube path, said apparatus comprising:
   (A) a lower platen positioned below said path;
   (B) an upper platen positioned above said path over said lower platen and mounted for vertical reciprocal movement relative to said lower platen between a raised rest position and a lowered cutting position;
   (C) upper linear guide means carried by said lower platen and effectively extending horizontally from one side of said path to the other side of said path at a position which is vertically spaced above the lower platen and the tube path;
   (D) lower linear guide means positioned below said upper guide means and on one side of said path;
   (E) a cross slide mounted for reciprocal horizontal movement on said first upper and lower guide means;
   (F) a notching blade mounted on said cross slide and operative to make a notching cut in the periphery of the tubing in response to the reciprocal movement of the cross slide on said guide means; and
   (G) a guillotine blade extending downwardly from said upper platen in the plane of said notching blade and operative to sever a section to tubing from the tube in response to movement of said upper platen from its raised position to its lowered position and following said notching cut of said notching blade.

4. Apparatus as defined in claim 3 wherein said cross slide engages and is supported by said upper linear guide means both on said one side and said other side over at least part of its reciprocal movement.

* * * * *